United States Patent [19]

Ishida et al.

[11] Patent Number: 5,041,918

[45] Date of Patent: Aug. 20, 1991

[54] FACSIMILE ADAPTER UNIT

[75] Inventors: Koki Ishida, Hadano; Nozomi Sawada, Ebina, both of Japan

[73] Assignee: Ricoh Company, Ltd., Tokyo, Japan

[21] Appl. No.: 545,500

[22] Filed: Jun. 29, 1990

[30] Foreign Application Priority Data

Jun. 30, 1989 [JP] Japan .................................. 1-166796
Nov. 9, 1989 [JP] Japan .................................. 1-290025

[51] Int. Cl.⁵ ............................................. H04N 1/00
[52] U.S. Cl. ..................................... 358/442; 358/450
[58] Field of Search ............... 358/442, 445, 450, 462, 358/452

[56] References Cited

U.S. PATENT DOCUMENTS

| | | | |
|---|---|---|---|
| 4,827,349 | 5/1989 | Ogata et al. | 358/442 |
| 4,949,188 | 8/1990 | Sato | 358/452 |
| 4,961,185 | 10/1990 | Sawada | 358/442 |
| 4,984,279 | 1/1991 | Kidney et al. | 358/450 |

Primary Examiner—Stephen Brinich
Attorney, Agent, or Firm—Oblon, Spivak, McClelland, Maier & Neustadt

[57] ABSTRACT

An adapter unit for use with a host apparatus for sending and receiving document information to and from a remote terminal via a communication network. The host apparatus creates document information which may be facsimile data, teletex data or mixed mode data. The adapter unit comprises an interface unit connected to the host apparatus, a bit map conversion unit for converting teletex and mixed code data into bitmap data, a facsimile encoding unit, a facsimile decoding unit, a print interface unit connected to the host apparatus, a communication control unit, and a system control unit which controls transmission of the document information from the host apparatus to a remote terminal and reception of the document information from the communication network such that the document information from the host apparatus is transmitted in a form which the remote terminal is capable of processing. The received document information is supplied to the host apparatus for printing via the print interface unit after a conversion by the bit map conversion unit into bitmap data when the received document information is teletex or mixed mode data.

10 Claims, 9 Drawing Sheets

1

FACSIMILE ADAPTER UNIT

BACKGROUND OF THE INVENTION

The present invention generally relates to facsimile apparatuses and more particularly to a facsimile adapter unit for use in a personal computer or a workstation for providing thereto a communication function of the group-4 facsimile apparatus.

As a telematique service terminal used in the integrated service digital network (ISDN), there are used apparatuses such as a group-4 facsimile apparatus for transmitting and receiving image information, a teletex apparatus for transmitting and receiving character information, and a mixed mode apparatus for transmitting and receiving document information wherein image information and character information are mixed.

In the case of the mixed mode apparatus, the apparatus is usually designed as a dedicated apparatus which explicitly performs the function of image transmission and reception of the class-3 terminal of a group-4 facsimile apparatus. However, such a dedicated apparatus has a problem in that the cost of the apparatus is high and a considerable space is occupied by the apparatus.

Under such circumstances, attempts have been made to use inexpensive personal computers or workstations as the mixed mode terminal apparatus for transmission and reception of documents by using with a facsimile adapter unit. Such a facsimile adapter unit provides the function of the group-4 facsimile apparatus wherein the document information made by the personal computer or facsimile apparatus acting as a host apparatus is stored once in the memory and sent to a destination terminal after establishing a connection. According to this approach, the mixed mode function is inexpensively added to the common personal computers and workstations and such an apparatus does not occupy a devoted space.

However, in such a conventional system, the document information created in the host apparatus is sent to the destination terminal in a form as it is, either in the teletex mode, the mixed mode or the facsimile mode, and associated therewith there occurs a problem in that the transmission of the document information may become impossible when the document information type does not agree with the document information type which can be received by the destination terminal.

SUMMARY OF THE INVENTION

Accordingly, it is a general object of the present invention to provide a novel and useful adapter unit, to be used in combination with a host apparatus for sending and receiving document information to and from a communication network, wherein the foregoing problems are eliminated.

Another object of the present invention is to provide an adapter unit to be used in combination with a host apparatus for sending and receiving document information to and from a remote terminal via a communication network, said host apparatus creating document information including one or more facsimile data, teletex data and mixed mode data, said adapter unit comprising interface means connected to the host apparatus for receiving document information therefrom; bit map conversion means supplied with the document information from the interface means for converting teletex data and mixed mode data contained in the supplied document information into bitmap data; facsimile encoding means for converting the bitmap data into facsimile image information; facsimile decoding means for converting facsimile image information into bitmap data; print interface means connected to the host apparatus for outputting print control data to the host apparatus for printing the bitmap data; communication control means connected to the communication network for sending and receiving document information to and from the network; and system control means for controlling the interface means, the bitmap conversion means, the facsimile encoding means, the facsimile decoding means, the print control means and the communication control means so as to transmit the document information supplied from the host apparatus to a remote terminal via the communication network and so as to receive the document information from the communication network such that the document information from the host apparatus is transmitted in a form which the remote terminal is capable of processing and such that the document information received from the communication network is supplied to the host apparatus for printing via the print interface means after a conversion by the bit map conversion means into bitmap data when the received document information comprises teletex data or mixed mode data. According to the present invention, the transmission of the document can be made in accordance with the processing capability of the destination terminal and a reliable document transmission can be made.

DETAILED DESCRIPTION

Figure 1:
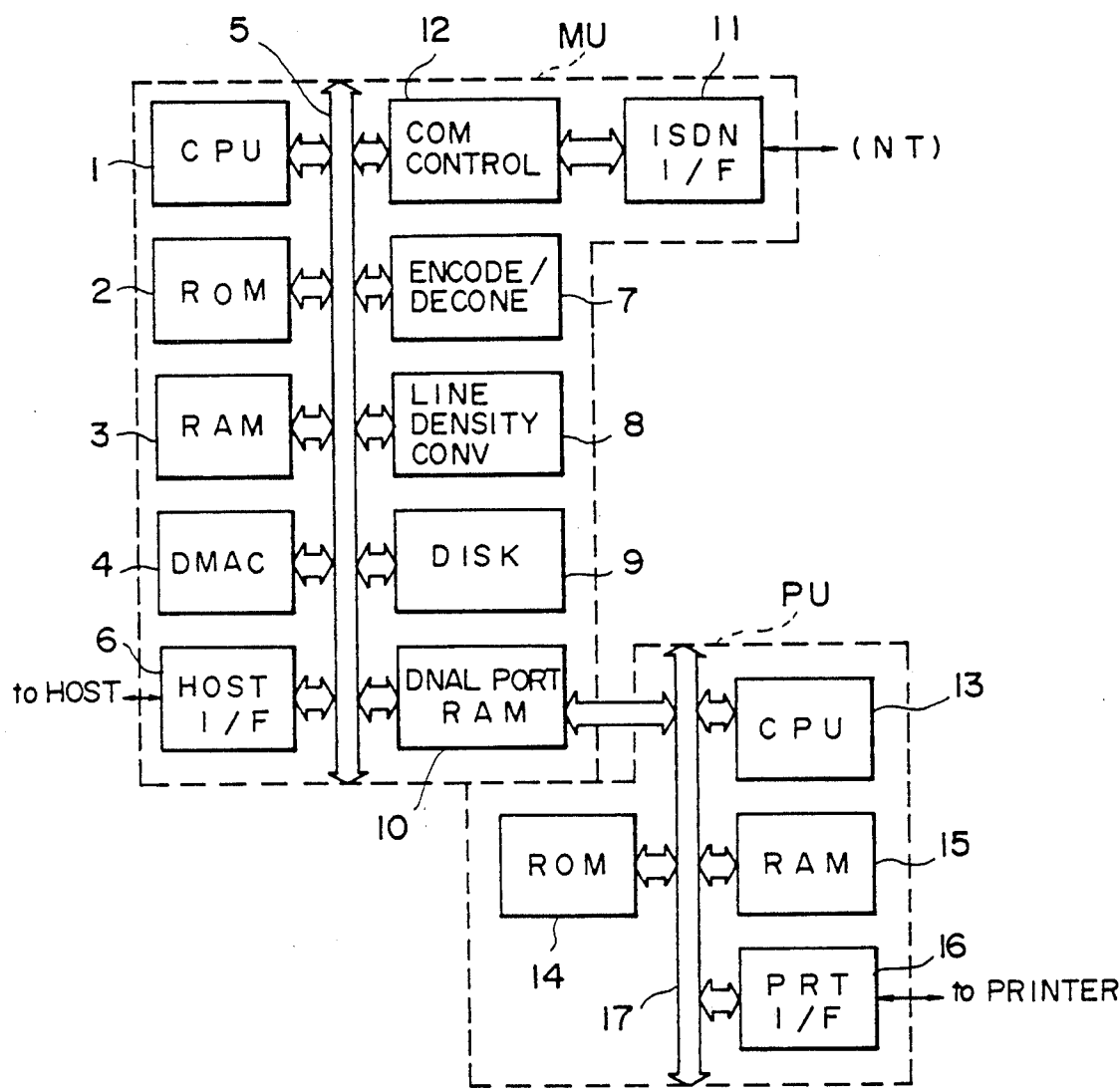
FIG. 1 is a block diagram showing the overall construction of the facsimile adapter unit according to a first embodiment of the present invention.

FIG. 1 shows a first embodiment of the present invention wherein a facsimile adapter unit for realizing the function of a group-4 facsimile apparatus is illustrated.

The adapter unit provides the function of the class-3 terminal of the group-4 facsimile apparatus to a host apparatus, and performs the steps, in addition to the ordinary transmission and reception procedure of the group-4 facsimile apparatus, such as the conversion of document information created by the host apparatus into intermediate data described by a page description language (PDL), the expansion of the intermediate data into bitmap data and the like. For this purpose, the adapter unit includes a main unit MU and a printer interface PU, wherein the main unit MU is used for the former purpose and the printer interface PU is used for the latter purpose.

As for the host apparatus, personal computers or workstations which are capable of creating the teletex document, facsimile document or the mixed mode document may be used, while as a page printer for outputting the document, laser beam printers are preferred.

In the main unit MU, there is provided a central processing unit (CPU) 1 for controlling the operation of the main unit MU such that the mixed mode information and the teletex mode information are converted to the intermediate data which is described by the page description language. Further, there are provided a read-only memory (ROM) 2 for storing various programs to be carried out by the CPU 1 as well as information necessary for carrying out the programs, a random access memory (RAM) 3 for providing a work area of the CPU 1, a direct memory access controller (DMAC) 4 for direct data transfer via a system bus 5 without using the CPU 1, and a host interface circuit 6 for exchanging various information with the host apparatus.

Further, there are provided an encoding/decoding unit 7 for converting the bitmap data to facsimile image information after a data compression process and for decoding the facsimile image information into the bitmap data, a line density conversion unit 8 for converting the resolution of the bitmap data, for example, from a first resolution of 200 picture elements per 25.4 mm to a second resolution of 300 picture elements per 25.4 mm and vice versa, a magnetic disk apparatus 9 for storing the document information transferred from the host apparatus or for storing the document information received from the remote terminal, and a dual port RAM 10 for exchanging data between the main unit MU and the printer interface unit PU.

Furthermore, there are provided an ISDN interface circuit 11 for connecting the adapter unit to an ISDN network and a communication controller 12 for performing the class-3 processing of the group-4 facsimile apparatus.

The CPU1, ROM2, RAM3, DMAC 4, the host interface circuit 6, the encoding/decoding unit 7, the line density conversion unit 8, the magnetic disk apparatus 9, the dual port RAM10, and the communication controller 12 are connected with each other by the system bus 5 which supports the exchange of information. It should be noted that the encoding/decoding unit 7 and the line density conversion unit 8 are connected directly with each other and thus the exchange of information between these two units is made directly.

In the printer interface unit PU, there is provided a second CPU 13 for an interpretation processing wherein the intermediate data described by the page description language and transferred from the main unit MU via the dual port RAM 10 is processed and expanded into corresponding bitmap data. Further, there are provided a ROM 14 for storing the program to be run by the CPU 13 and for storing the font information (outline font) which is used at the time of converting the character data into corresponding image data, a RAM 15 for storing the bitmap data produced by the CPU 13 or supplied from the main unit MU, and a printer interface circuit 16 for outputting the bitmap data stored in the RAM 15 to the page printer connected to the printer interface unit PU.

The CPU 13, the ROM 14, the RAM 15 and the printer interface circuit 16 are connected with each other by an internal bus 17 which supports the exchange of information between the units connected thereto. Further, one of the input ports of the dual port RAM 10 in the main unit MU is connected to the internal bus 17 such that the data transferred through the dual port RAM 10 is transferred further to one or more of the elements connected to the internal bus 17.

Next, the mixed mode information which is processed by the mixed mode apparatus will be described.

Figure 2:
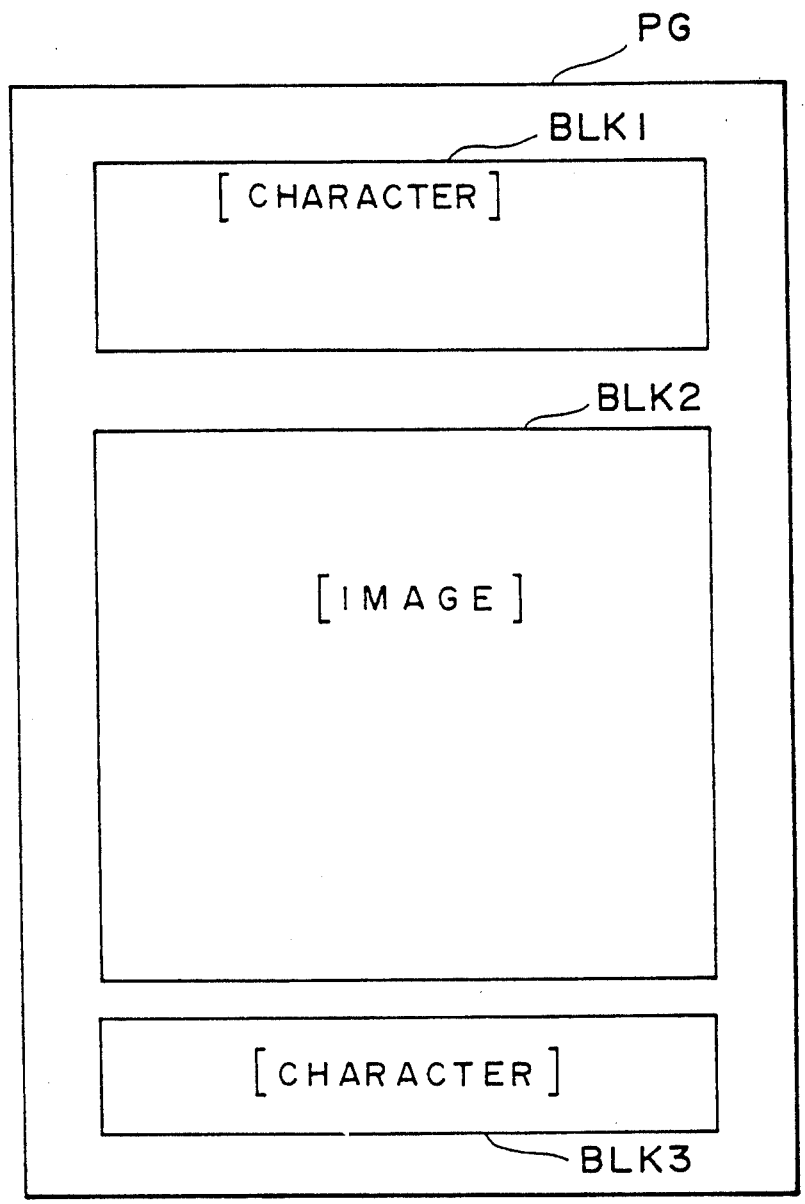
FIG. 2 is a diagram for showing an example of mixed mode information.

FIG. 2 shows typical mixed mode information wherein the mixed mode information is formed into a number of pages PG each including blocks BLK1, BLK3 and the like for character strings and a block BLK2 and the like for image data. The blocks BLK1-BLK3 are disposed at respective predetermined positions and the mixed mode information is formed as a pair of items of information including a first information item indicative of the layout of the blocks and a second information item indicative of the content of the blocks. In the case of the teletex information, on the other hand, the information is formed explicitly from the character string. Further, in the case of the facsimile information, the information is formed explicitly from the image data.

The page description language is a protocol for defining the type of font, size, serif, rotation, magnification, filling of the pattern, thickness of the line, attribute of the line, arrangement of the line and the like, and the processing system for processing the data described by the page description language is called a PDL interpreter system. The PDL interpreter system produces bitmap data of characters and images for recording by the page printers in response to the input of the intermediate data written by the page description language.

Although the intermediate data which can be processed by the PDL interpreter system and the mixed mode data, respectively, are different from each other with respect to the information structure, type of the character code, the layout, the format of the information and the like, the conversion of the mixed mode data into the intermediate data is still possible because the intermediate data has a content basically identical to that of the mixed mode information. Thus, by processing the intermediate data after the conversion by the PDL interpreter system, bitmap data corresponding to the mixed mode data can be obtained.

As a result of the use of the page description language, use of an existing PDL interpreter system becomes possible and the necessity of developing special software for expanding the mixed mode information into the bitmap data can be eliminated. Thereby, the time needed to design and develop a new adapter unit can be shortened and the cost needed therefore can also be reduced.

In the adapter unit of the present embodiment shown in FIG. 1, the creation of the document in the host apparatus can be made such that the text editing process and the image editing process are made integrally, and the created document can be in the mixed mode data, the teletex data or the facsimile data form.

Figure 3A:
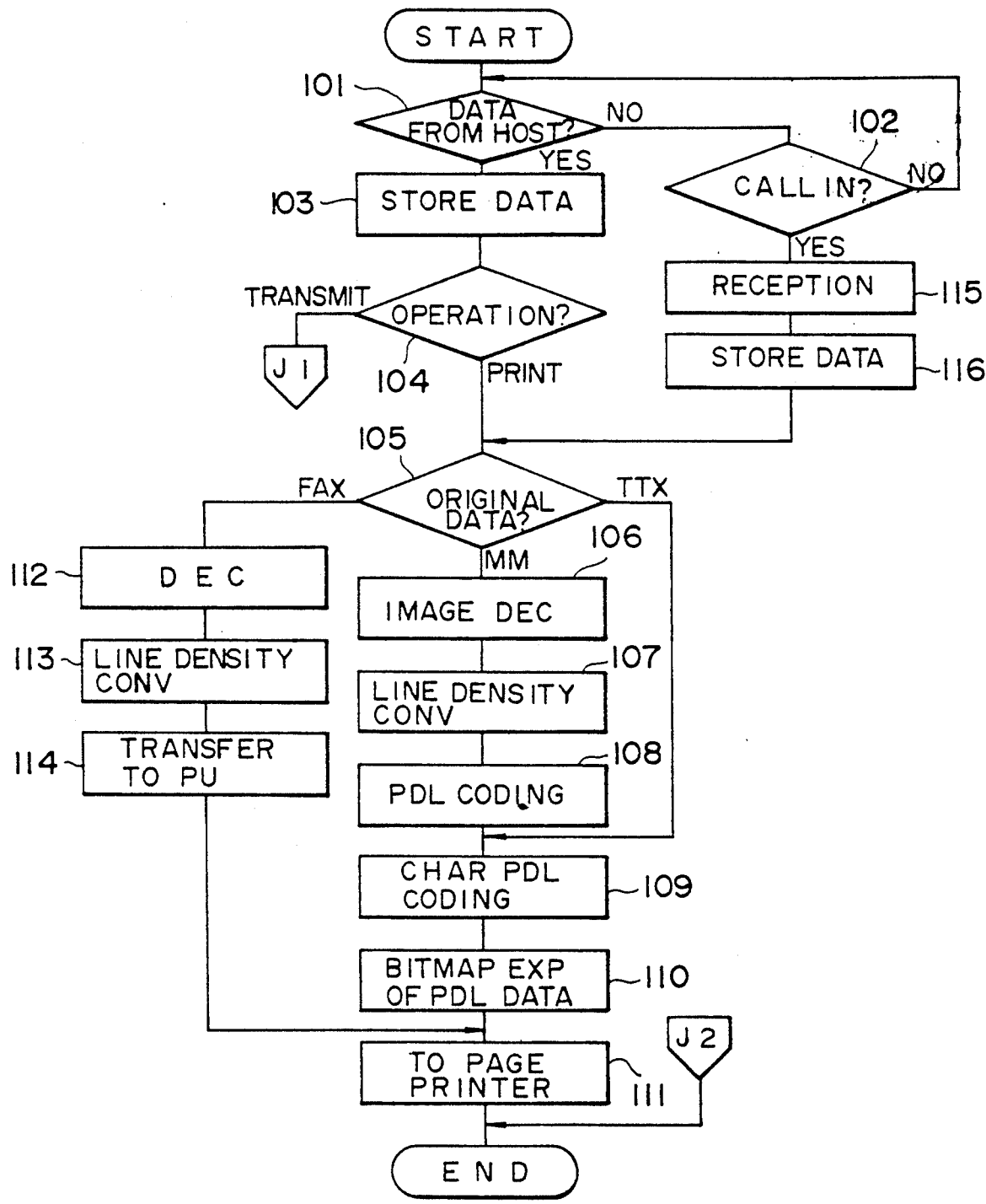
FIGS. 3A and 3B are flowcharts showing the operation of the apparatus of FIG. 1.
Figure 3B:
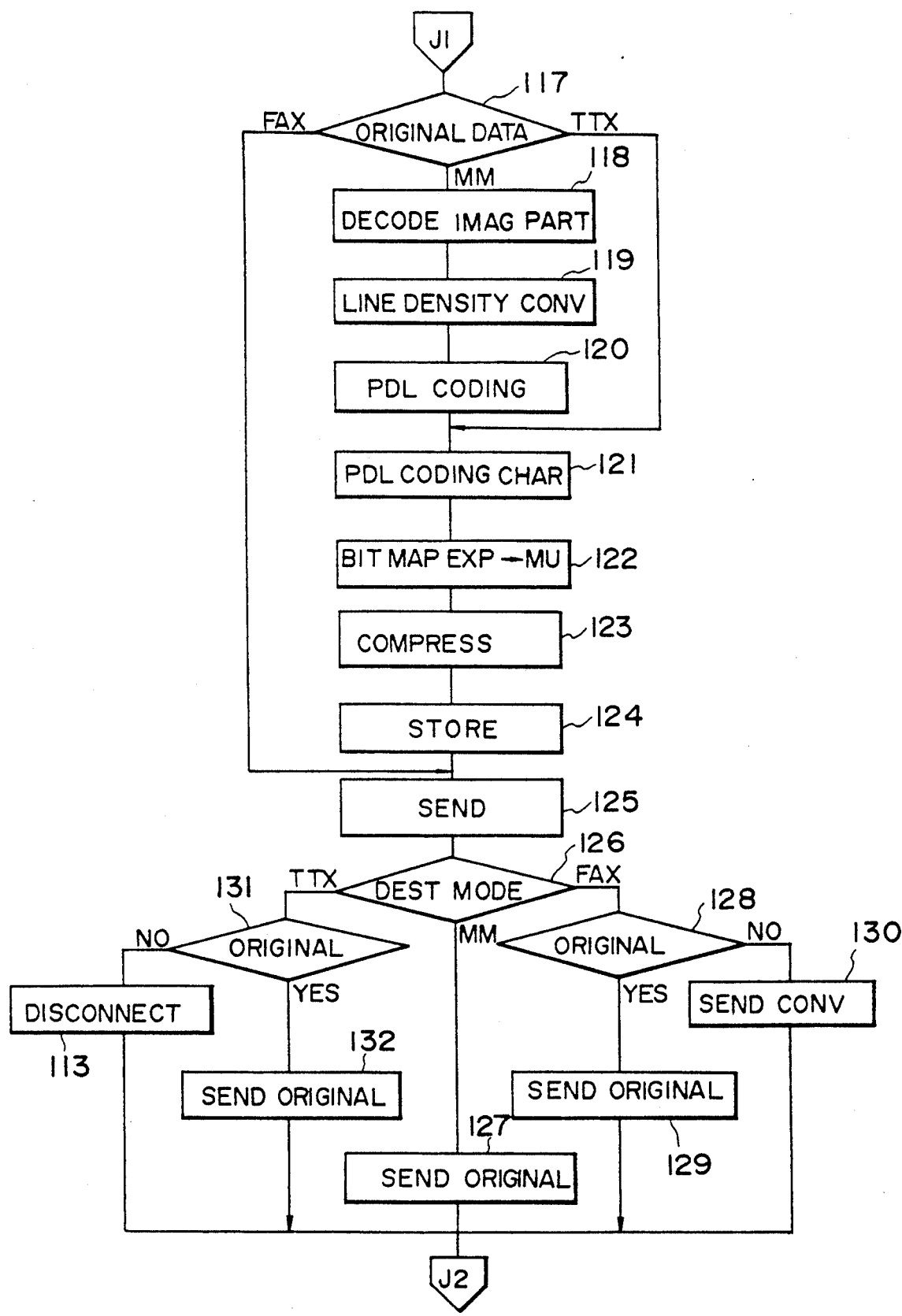

FIGS. 3A and 3B show the processing performed by the adapter unit of FIG. 1.

Referring to the drawings, in steps 101 and 102, the CPU 1 of the main unit MU is waiting for the incoming of a data transfer request from the host apparatus or for the detection of a call by the communication controller 12 as represented by the loop corresponding to the decision "NO".

When there is a request from the host apparatus for the data transfer in correspondence to "YES" in the step 101, the document information referred to hereinafter as original data sent from the host apparatus in response to the data transfer request is stored in the magnetic disk apparatus 9 in a step 103 and a discrimination is made in a step 104 whether there is a command for printing or a command for transmission in the request from the host apparatus.

When there is a command for printing, a discrimination is made in a step 105 whether the mode of the original data is the mixed mode (MM), the teletex mode (TTX) or the facsimile mode (FAX). In the case that the original data is the mixed mode data, a process to extract the data corresponding to the image part from the original data is performed in a step 106 and the extracted image data is converted back to the bitmap data by the encoding/decoding unit 7. When the resolution of the bitmap data is different from the resolution of the page printer, a conversion of the resolution is made in a step 107 by the line density conversion unit 8 and the bitmap data thus obtained is stored in the magnetic disk apparatus in a step 108 after a conversion to the intermediate data described by the page description language.

Next, the character part of the original data is extracted in a step 109 and stored in the magnetic disk apparatus 9 after the conversion to the intermediate data. Further, the intermediate data stored in the magnetic disk apparatus 9 is transferred to the RAM 15 in the printer interface unit PU via the dual port RAM 10.

Subsequent to the foregoing process, the CPU 13 of the printer interface PU expands the intermediate data stored in the RAM 15 by the PDL interpreter system into the corresponding bitmap data, and stores the bitmap data in a page memory area defined in the RAM 15 in a step 110.

Next, the printer interface circuit 16 controls the page printer in a step 111 such that the bitmap data stored in the page memory area of the RAM 15 is sequentially transferred to the page printer and a recording of the document information is made on a sheet.

In the case that the original data is the teletex data in the discrimination step 105, on the other hand, the process 109 is carried out immediately after the step 105 and the conversion of the character data into the intermediate data is achieved. Further, in the case that the original data is the facsimile image information, a step 112 to decode the original data into the bitmap data is performed immediately after the step 105. When the resolution of the line density is different from that of the page printer, the conversion of the bitmap data to the bitmap data having the resolution of the page printer is made in the step 113 in a manner similar to the step 107. Further, the converted bitmap data is transferred to the page memory area of the RAM 15 in the printer interface unit PU via the dual port RAM 10 in a step 114. In response to the completion of the step 114, the printer interface circuit 14 carries out the step 111 wherein the bitmap data in the page memory area is transferred to the page printer and recorded on the recording sheet.

Next, the operation of the adapter unit of FIG. 1 will be described in the case that an incoming call from the network is detected in the step 102. When this occurs, a predetermined reception procedure is performed in a step 115 by the communication controller 12 and the received information is stored once in the magnetic disk apparatus 18 in a step 116. After the step 116, the process starting from the step 105 onwards is performed as already described.

In the case that there is a command from the host apparatus to transmit the document information in the step 101, a discrimination is made in a step 117 (FIG. 3B) whether the original data is the mixed mode data, the teletex data or the facsimile data.

When the original data is the mixed mode data, the image part of the original data is at first extracted in a step 118 and is decoded into the original bitmap data in the encoding/decoding unit 7. Further, when the obtained bitmap data has a resolution which is different from a standard resolution, the line density conversion unit 8 is used in a step 119 to convert the resolution of the bitmap data into the bitmap data having the standard resolution. The bitmap data thus obtained is converted into the intermediate data and stored in the magnetic disk apparatus 9 in a step 120.

Next, the character data in the original data is extracted and stored in the magnetic disk apparatus 9 in a step 121 after conversion to the intermediate data. Further, the intermediate data thus stored in the magnetic disk apparatus 9 is transferred to the RAM 15 of the printer interface unit PU via the dual port RAM 10 in the step 121.

In a step 122, the intermediate data stored in the RAM 15 is expanded into a corresponding bitmap data by the CPU 13 of the printer interface unit PU acting as the PDL interpreter system, and the bitmap data thus produced is transferred to the main unit MU via the dual port RAM 10.

In a step 123, the transferred bitmap data is compressed by the encoding/decoding unit 7 under control of the CPU 1 of the main unit MU, and the image information thus obtained is stored in the magnetic disk apparatus 9 in a step 124 as converted facsimile image information.

Next, in a step 125, the CPU 1 controls the communication controller 12 to start the transmission procedure on the basis of the destination information transferred from the host apparatus.

In the case that the original data is the teletex data, on the other hand, the step 121 is performed immediately after the step 117 and the character part is converted to the intermediate data. Further, in the case that the original data is the facsimile data, the step 125 is performed immediately after the step 117.

In the step 125, the communication control sequence of the communication controller 12 is started wherein a predetermined procedure to establish a call is carried out between the ISDN interface 11 and the ISDN network for providing a communication path to the destination station. When the communication procedure proceeds to the step of transferring the document information, a discrimination is made in a step 126 whether the destination terminal is operating in the mixed mode, the teletex mode or the facsimile mode.

When the destination terminal is operating in the mixed mode, the destination terminal can receive the mixed mode data, the teletex data or the facsimile data without any problem. Thus, the original data stored in the magnetic disk apparatus 9 is transmitted as it is in the step 127.

In the case that the destination terminal is operating in the facsimile mode, there is a possibility that the terminal will accept only the facsimile transmission and reject the mixed mode or teletex data. Thus, a discrimination is made in a step 128 whether the original data is the facsimile data or not, and only in the case that the result is YES, the original data is transmitted as it is in a step 129, while when the original data is not the facsimile data, the converted facsimile image data is transmitted in a step 130.

Further, in the case that the destination terminal is operating in the teletex mode, a discrimination is made in a step 131 whether the original data is the teletex data or not. If YES, the original data stored in the magnetic disk apparatus 9 is transmitted in a step 132, while if the result of the step 131 is NO, the connection is disconnected in a step 133 and the host apparatus is informed of the disconnection of the communication.

According to the foregoing procedure, a reliable transmission of document information becomes possible by selectively sending out the original data of the converted facsimile data in response to the function or capability of the destination terminal. When the transmission is completed, the CPU 1 of the main unit MU informs the host apparatus of the completion of transmission. Further, the adapter unit of the present embodiment can operate effectively even when the capability of the destination terminal is not known in advance by the host apparatus by performing the step 126 for discriminating the function of the destination terminal in the adapter unit side. Furthermore, as the adapter unit can operate independently from the host apparatus when receiving a facsimile transmission and outputting recording data, the processing load in the side of the host apparatus is reduced. It should be noted that the adapter unit can operate even when the power of the host apparatus is not on. Although the foregoing embodiment is not equipped with the function to convert the original data into the teletex information, such a conversion function can easily be added.

In the first embodiment described heretofore, it should be noted that the mixed mode data is always converted to the facsimile data while such a process is unnecessary when the reception side terminal is capable of processing mixed mode data. In the description hereinafter, a second embodiment of the present invention will be described wherein the foregoing problem is eliminated.

Figure 4:
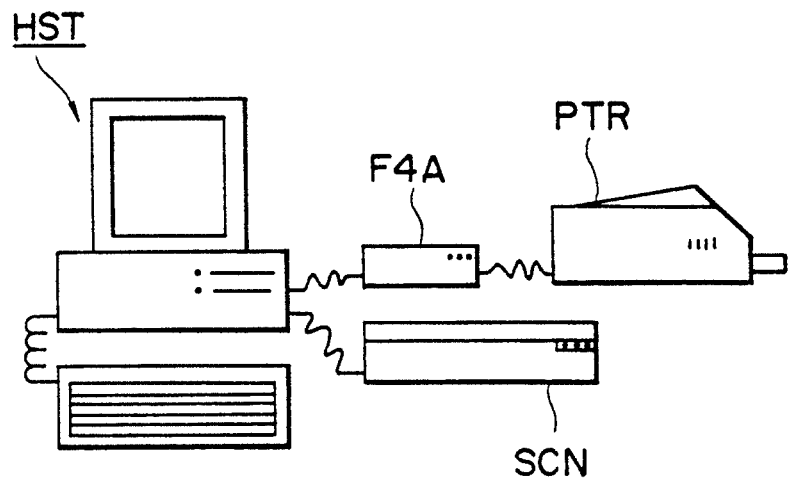
FIG. 4 is an overall view showing a data processing system according to a second embodiment of the present invention.

FIG. 4 shows the overall construction of the data processing system wherein the adapter unit according to the second embodiment is used. It should be noted that the construction is fundamentally the same as that shown in FIG. 1 in the form of the block diagram.

Referring to FIG. 4, there is provided a host apparatus HST which may be a personal computer, and to which a scanner SCN for reading a document and a group-4 facsimile adapter unit F4A are connected. Further, a laser beam printer PTR is connected to the adapter unit F4A.

It is assumed hereinafter that the host apparatus HST is capable of creating the document data in the mixed mode and is equipped with an address book function for storing address information for each of the terminals. The address information includes the communication mode which the destination terminal can process.

Figure 5:
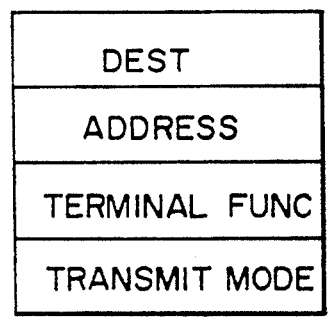
FIG. 5 is a schematical view showing an example of an item forming address book information.

FIG. 5 shows an example of the address information. As illustrated, the address information is formed from the designation of the destination terminal, the ISDN address code of the destination terminal, the terminal function information for designating the function of the destination terminal, and the communication mode information which designates the communication mode used for data communication with the destination terminal. The address information is recorded by the operator according to a predetermined registration procedure previous to the data transmission and can be updated as necessary after the data transmission.

Figure 6:
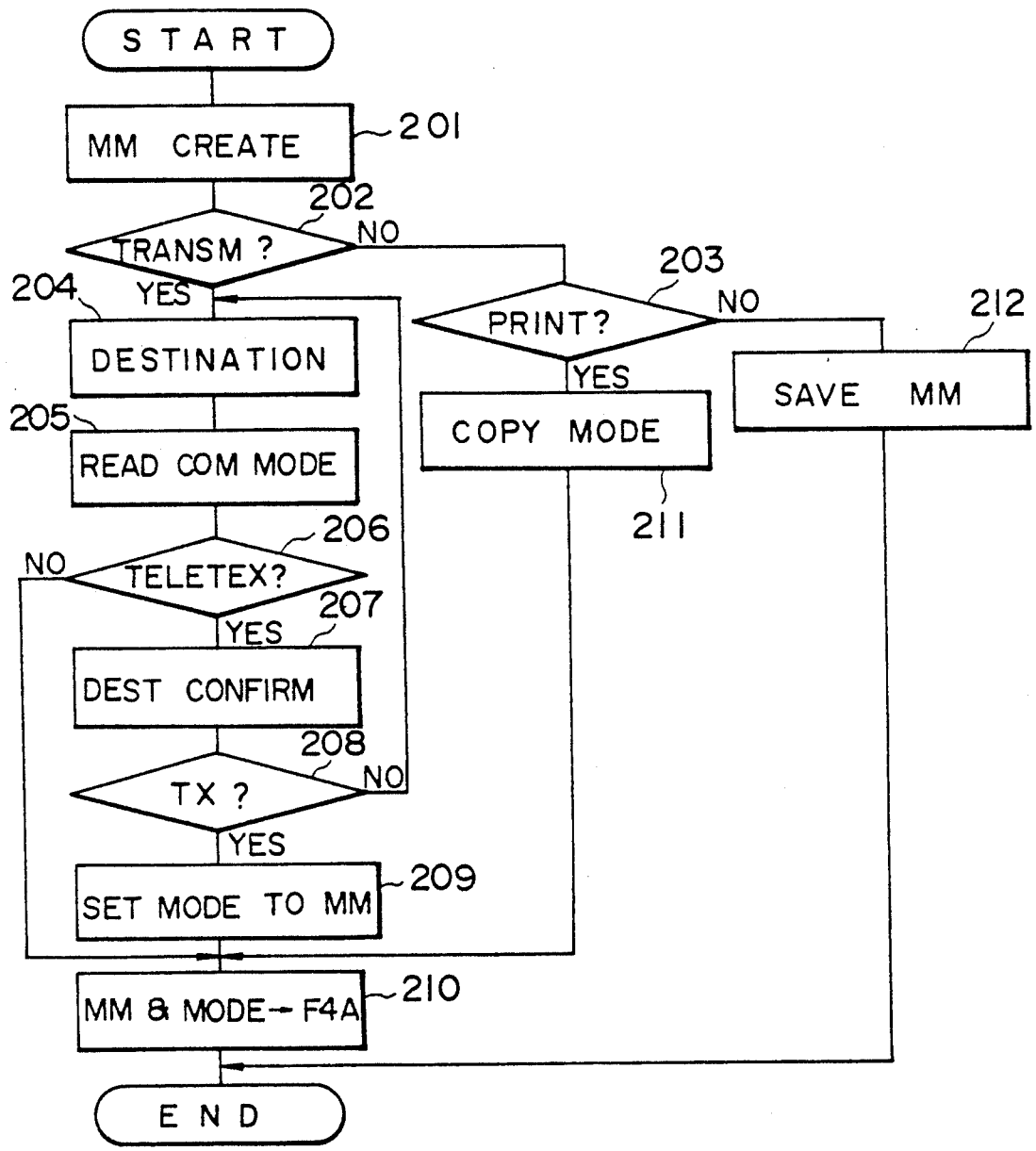
FIG. 6 is a flowchart showing an example of processing carried out in a host apparatus when creating a mixed mode document.

FIG. 6 shows an example of the process performed by the host apparatus HST. After a step 201 wherein a mixed mode document data is created by the host apparatus, a request is made to the operator in step 202 and 203 to command whether the document data is to be transmitted, printed or to be saved.

When an instruction to transmit the data is given in response to YES of the step 202, a selection is made on the basis of a review of the address information in a step 204 as to which terminal the transmission is to be made to.

When the operator has selected the destination terminal in the step 204, the function and the transmission mode of the destination terminal is read out from the address book in a step 205, and a further discrimination is made in a step 206 whether the destination terminal is capable of processing the mixed mode data or not.

If the result is YES, a confirmation is made with the operator in a step 207 with respect to the continuation of the transmission by informing the operator that the destination terminal is a teletex terminal. It should be noted that the host apparatus HST is not capable of creating the teletex mode data.

When the operator has commanded the continuation of the transmission in response to YES in a discrimination step 208, the content of the terminal function information is modified to that of the mixed mode terminal in a step 209, and command data commanding the transmission operation, the created document data, the terminal function information as well as the communication mode information are transferred to the adapter unit F4A in a step 210.

On the other hand, when the operator has commanded the cancellation of transmission, the process is returned to the step 204 for asking a next destination terminal. When the destination terminal designated by the process 204 is the mixed mode terminal or the facsimile terminal and the result of discrimination in the step 206 is NO in correspondence thereto, the process is jumped from the step 206 to the step 210 and the command data, document data, the terminal function information and the transmission mode information are transferred to the adapter unit F4A as already described.

When the operator has commanded the printing of the document in the step 203, the result of the discrimination in the step 203 becomes YES and the print command is produced. Further, the print command is transferred to the facsimile adapter unit F4A in the step 210 after the setup of the copy mode in a step 211. Further, when the operator has commanded the saving of the document in the step 202, the result of the discrimination in the step 202 becomes NO and the created document data is saved in a suitable memory device provided on the host apparatus HST.

Figure 7A:
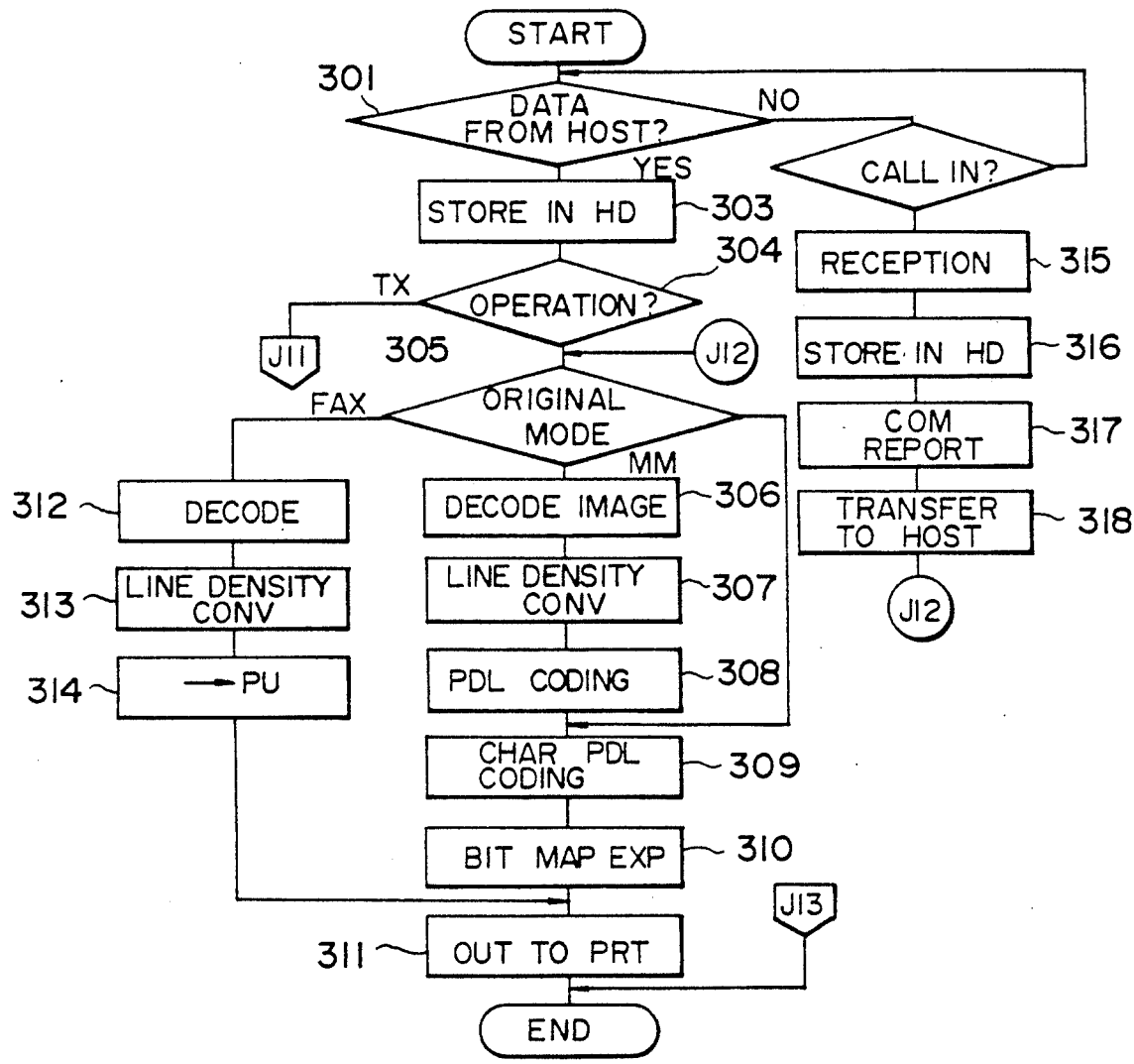
FIGS. 7A and 7B are flowcharts showing an example of processing of a group-4 facsimile apparatus.
Figure 7B:
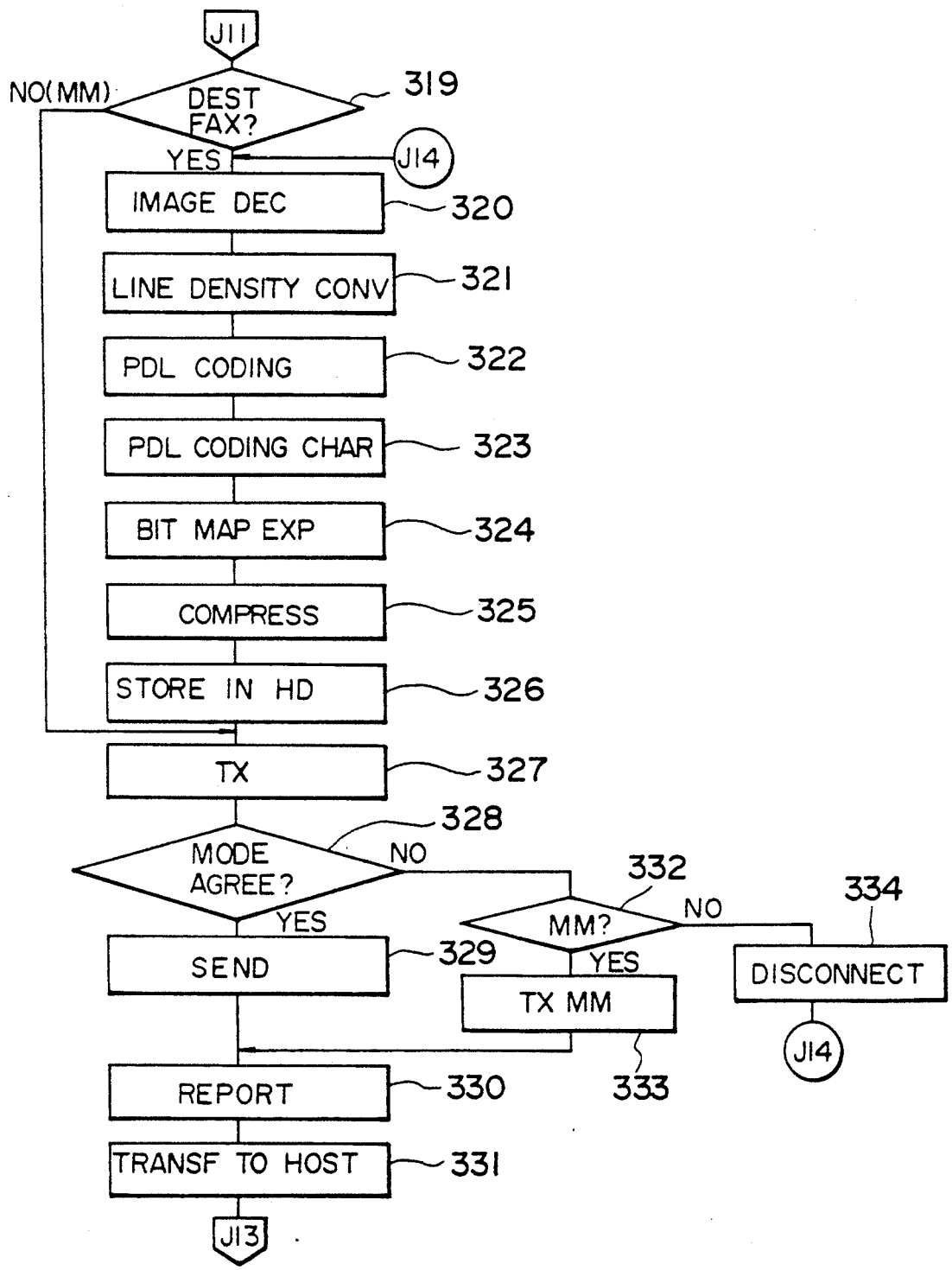

FIGS. 7A and 7B show an example of processing performed in the group-4 facsimile adapter unit F4A.

Referring to the drawings, in steps 301 and 302, the CPU 1 of the main unit MU is waiting for an incoming data transfer request from the host apparatus or for the detection of the call by the communication controller 12 as represented by the loop corresponding to the decision "NO".

When there is a request from the host apparatus for the data transfer in correspondence to "YES" in the step 301, the document information referred to hereinafter as original data sent from the host apparatus in response to the data transfer request is stored in the magnetic disk apparatus 9 in a step 303 and a discrimination is made in a step 304 whether there is a command for printing or a command for transmission in the request from the host apparatus.

When there is a command for printing, a discrimination is made in a step 305 whether the mode of the original data is the mixed mode (MM), the teletex mode (TTX) or the facsimile mode (FAX). In the case that the original data is the mixed mode data, a process to extract the data corresponding to the image part from the original data is performed in a step 306 and the extracted image data is converted back to the bitmap data by the encoding/decoding unit 7. When the resolution of the bitmap data is different from the resolution of the page printer, a conversion of the resolution is made in a step 307 by the line density conversion unit 8 and the bitmap data thus obtained is stored in the magnetic disk apparatus in a step 308 after a conversion to the intermediate data described by the page description language.

Next, the character part of the original data is extracted in a step 309 and stored in the magnetic disk apparatus 9 after the conversion to the intermediate data. Further, the intermediate data stored in the magnetic disk apparatus 9 is transferred to the RAM 15 in the printer interface unit PU via the dual port RAM 10.

Subsequent to the foregoing process, the CPU 1 of the printer interface PU expands the intermediate data stored in the RAM 15 by the PDL interpreter system into the corresponding bitmap data, and stores the bitmap data in a page memory area defined in the RAM 15 in a step 310.

Next, the printer interface circuit 16 controls the page printer PTR in a step 311 such that the bitmap data stored in the page memory area of the RAM 15 is sequentially transferred to the page printer and the printer PTR makes a recording of the document information on a sheet.

In the case that the original data is the teletex data in the discrimination step 305, on the other hand, the process 309 is carried out immediately after the step 305 and the conversion of the character data into the intermediate data is achieved. Thereafter, the printing is made by the page printer PTR in a step 311.

Further, in the case that the original data is the facsimile image information, a step 312 to decode the original data into the bitmap data is performed immediately after the step 305. When the resolution of the line density is different from that of the page printer, the conversion of the bitmap data to the bitmap data having the resolution of the page printer is made in the step 313 in a manner similar to the step 307. Further, the converted bitmap data is transferred to the page memory area of the RAM 15 in the printer interface unit PU via the dual port RAM 10 in a step 314. In response to the completion of the step 314, the printer interface circuit 14 carries out the step 311 wherein the bitmap data in the page memory area is transferred to the page printer and recorded on the recording sheet.

Next, the operation of the adapter unit of FIG. 1 will be described in the case that an incoming call from the network is detected in the step 302. When this occurs, a predetermined reception procedure is performed in a step 315 by the communication controller 12 and the received information is stored once in the magnetic disk apparatus 18 in a step 316.

Next, a communication report including a report indicating the result of reception, the ISDN address of the transmitting terminal as well as its terminal information and the communication mode information is prepared in a step 317 and the communication report thus made is transferred to the host apparatus HST in a step 318. Next, the step 305 is performed again and the steps following thereto are performed.

In the case that there is a command from the host apparatus to transmit the document information in the step 301, a discrimination is made in a step 319 whether the destination terminal is a facsimile terminal or not on the basis of the terminal mode information of the destination terminal.

When the destination terminal is the facsimile terminal and the result of discrimination in the step 319 is YES, the image part of the original data is at first extracted in a step 320 and is decoded into the original bitmap data in the encoding/decoding unit 7. Further, when the obtained bitmap data has a resolution which is different from a standard resolution, the line density conversion unit 8 is used in a step 321 to convert the resolution of the bitmap data into the bitmap data having the standard resolution. The bitmap data thus obtained is converted into the intermediate data and stored in the magnetic disk apparatus 9 in a step 322.

Next, the character data in the original data is extracted and stored in the magnetic disk apparatus 9 in a step 323 after conversion to the intermediate data. Further, the intermediate data thus stored in the magnetic disk apparatus 9 is transferred to the RAM 15 of the printer interface unit PU via the dual port RAM 10 in the step 323.

In a step 324, the intermediate data stored in the RAM 15 is expanded into a corresponding bitmap data by the CPU 13 of the printer interface unit PU acting as the PDL interpreter system, and the bitmap data thus produced is transferred to the main unit MU via the dual port RAM 10.

In a step 325, the transferred bitmap data is compressed by the encoding/decoding unit 7 under control of the CPU 1 of the main unit MU, and the image information thus obtained is stored in the magnetic disk apparatus 9 in a step 326 as converted facsimile image information.

Next, in a step 327, the CPU 1 controls the communication controller 12 to start the transmission procedure on the basis of the destination information transferred from the host apparatus.

In the case that the destination terminal is the mixed mode terminal in correspondence to the result NO in the step 319, the step 327 is performed immediately.

In the step 327, the communication control sequence of the communication controller 12 is started wherein a predetermined procedure to establish a call is carried out between the ISDN interface 11 and the ISDN network for providing a communication path to the destination station. When the communication procedure proceeds to the step of transferring the document information, a discrimination is made in a step 328 whether the destination terminal is operating in the mixed mode, the teletex mode or the facsimile mode.

When the function of the destination terminal agrees to the function of the sending terminal in correspondence to the result YES in the step 328, transmission of the document data is made in accordance with the mode specified by the host apparatus HST. Further, the communication report including the result of the transmission, the ISDN address of the destination, the terminal information received from the destination and the communication mode information used for the transmission is prepared in a step 330 and the communication report is transferred to the host apparatus HST in a step 331.

In the case that the function of the destination terminal does not agree to the specified function in correspondence to the result NO in the step 328, a discrimination is made in a step 332 whether the terminal function identified by the destination terminal is the mixed mode or not and if YES, the document data is transmitted in the mixed mode in a step 333 and the step 330 is performed as already described.

Further, in the case that the destination terminal is the facsimile terminal and the result of the discrimination in the step 332 is NO, the transmission under progress is interrupted once in a step 334 and the data conversion is made by performing the step 320. Thereafter, the transmission is made again to the same destination.

According to the foregoing embodiment, the discrimination is made with respect to whether the mode conversion of the document is to be made or not on the basis of the information of the terminal function which is received from the host apparatus HST, and the unnecessary conversion of the document, as in the case where the document from the host apparatus can be sent as it is, can be eliminated.

Figure 8:
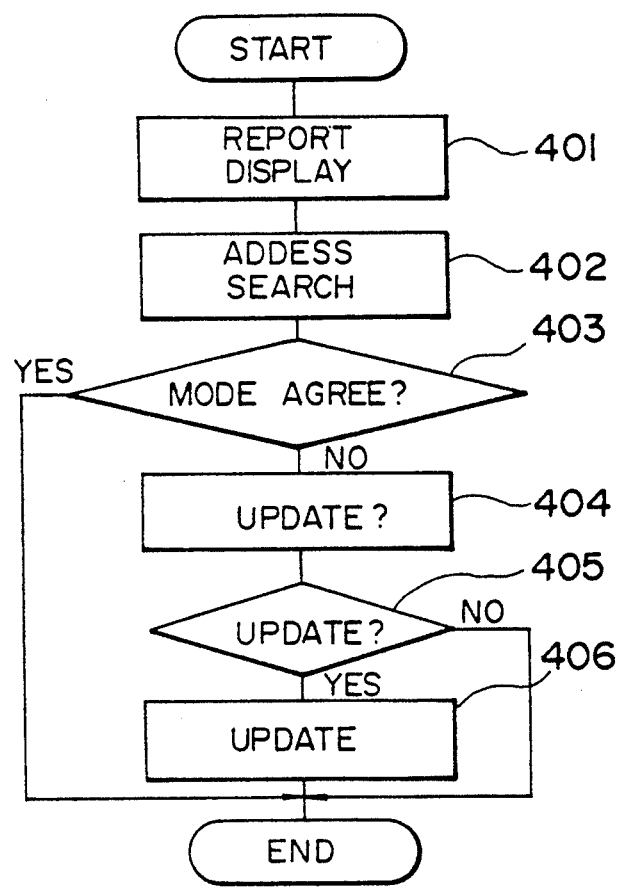
FIG. 8 is a flowchart showing an example of processing carried out in a host apparatus when a communication report is received.

FIG. 8 shows an example of the process performed by the host apparatus in response to the incoming of the communication report from the adapter unit F4A.

Referring to FIG. 8, the communication report is displayed in a step 401 according to a predetermined format for examination of the operator. Next, the data stored in the address book having the address which coincides with the ISDN address contained in the communication report is read out in a step 402, and an examination is made in a step 403 whether the terminal function information registered in the data agrees to the terminal function information in the communication report.

When the result of the examination is NO, indicating that there is a discrepancy in the terminal function registered in the communication report and the terminal function, a message is displayed in a step 404 asking whether the terminal function information in the address book is to be updated or not in correspondence to the result of the communication report.

In response to the message, the operator enters the command either to update or not update the content in a step 405, and in response to the command for the updating, a step for updating the content is performed in a step 406.

According to the foregoing processes, the content of the address book is always updated in conformance with the actually carried out communication mode each time the transmission is made, and the adapter unit can respond to the replacement of the facility in the destination terminal without problem.

Further, the intervention of the operator in the step 405 can be eliminated. For example, the automatic updating of the address book may be so prohibited that the updating can only be made by the operator. Further, automatic enlisting of the terminal function information in the address book in response to an incoming call from a terminal not registered may be performed. Alternatively, the automatic updating of the address book may be made each time the data transmission is made. Further, such a managing function of the address book may be provided to the facsimile adapter unit instead of the host apparatus.

Further, the present invention is not limited to the embodiments described heretofore but various variations and modification can be made without departing from the scope of the invention.

What is claimed is:

1. An adapter unit to be used in combination with a host apparatus for sending and receiving document information to and from a remote terminal via a communication network, said host apparatus creating document information including one or more facsimile data, teletex data and mixed mode data, said adapter unit comprising:

interface means connected to the host apparatus for receiving document information therefrom;

bit map conversion means supplied with the document information from the interface means for converting teletex data and mixed mode data contained in the supplied document information into bitmap data;

facsimile encoding means for converting the bitmap data into a facsimile image information;

facsimile decoding means for converting a facsimile image information into bitmap data;

print interface means connected to the host apparatus for outputting a print control data to the host apparatus for printing the bitmap data;

communication control means connected to the communication network for transmitting and receiving document information to and from the network; and system control means for controlling the interface means, the bitmap conversion means, the facsimile encoding means, the facsimile decoding means, the print control means and the communication control means so as to transmit the document information supplied from the host apparatus to a remote, destination terminal via the communication network and so as to receive the document information from the communication network, said system control means detecting, when transmitting document information to a destination terminal, the type of the document information which the destination terminal can process, said system control means further transmitting the document information from the host apparatus either in the facsimile data, the teletex data or the mixed mode data form so that the destination terminal can process the transmitted document information, said system controller further detecting, when receiving document information from the communication terminal, whether the document information is the teletex data, the mixed mode data or the facsimile data and controlling, on the basis of the detection, such that the received document information is supplied to the host apparatus for printing via the print interface means after a conversion to bitmap data by the facsimile decoding means when the received document information comprises facsimile data, said system controller further controlling such that the received document information is supplied to the host apparatus for printing via the print interface means after a conversion by the bit map conversion means into bitmap data when the received document information comprises teletex data or mixed mode data.

2. An adapter unit as claimed in claim 1 in which said system control means comprises first means for controlling the communication control means so as to monitor the arrival of document information from the communication network and further controlling the communication control means so as to perform a predetermined reception process in response to the arrival thereof, second means supplied with the received document information from the communication control means for discriminating whether the document information comprises mixed mode data, teletex data or facsimile data, third means for controlling the bitmap conversion means, when the received document information comprises the mixed mode data or the teletex data, such that the received document information is converted to bitmap data by the bitmap conversion means, fourth means for controlling the facsimile decoding means, when the received document information comprises the facsimile data, such that the received document information is decoded into bitmap data by the facsimile decoding means, and fifth means for controlling the print interface such that the bitmap data produced by the third means or fourth means in correspondence to the received document information is printed out by the host apparatus.

3. An adapter unit as claimed in claim 2 in which said third means further comprises decoding means for decoding an image part of the received document information when the document information comprises mixed mode data.

4. An adapter unit as claimed in claim 3 in which said third means further comprises encoding means for encoding a decoded image part of the received document information into encoded data described by a page description language prior to the conversion of the received document data into the bitmap data.

5. An adapter unit as claimed in claim 4 in which said third means further comprises another encoding means for encoding a character part of the received document information into encoded data described by the page description language prior to the conversion of the received document information into the bitmap data.

6. An adapter unit as claimed in claim 2 in which said system control means further comprises sixth means for controlling the interface means so as to monitor an incoming of document information from the host apparatus, seventh means for discriminating whether the document information supplied from the host apparatus comprises mixed mode data, teletex data or facsimile data, eighth means for discriminating whether the remote destination terminal, to which the document information from the host apparatus is to be transmitted, is capable of processing the mixed mode data, teletex data or the facsimile data, ninth means for controlling the communication control means, when the destination terminal is capable of processing mixed mode data, such that the document information supplied from the host apparatus is sent out to the communication network by the communication control means as it is, said ninth means further controlling the communication control means, when the destination terminal is capable of processing teletex data and when the document information supplied from the host apparatus comprises teletex data, such that the document information supplied from the host apparatus is sent out to the communication network by the communication control means as it is, said ninth means further controlling the communication control means, when the destination terminal is capable of processing facsimile data and when the document information supplied from the host apparatus comprises facsimile data, such that the document information supplied from the host apparatus is sent out to the communication network by the communication control means as it is, said ninth means further controlling the communication control means and the bitmap conversion means, when the destination terminal is capable of processing facsimile data, such that the document information supplied from the host apparatus is sent out to the communication network after a conversion into bitmap data corresponding to the document information by the bitmap conversion means.

7. An adapter unit as claimed in claim 6 in which said ninth means further comprises means for decoding an image part contained in the document information from the host apparatus when the document information comprises mixed mode data and encoding means for converting the decoded image part into data described by the page description language prior to the conversion into the bitmap data.

8. An adapter unit as claimed in claim 7 in which said ninth means further comprises means for encoding a character part in the document information from the host apparatus into data described by the page description language.

9. An adapter unit as claimed in claim 1 in which said control means further comprises memory means for storing data mode information indicative of the document information type which the destination terminals can process for each of the destination terminals, and conversion means for converting the document information supplied from the host apparatus together with destination information designating a destination terminal into document information which the destination terminal can process.

10. An adapter unit as claimed in claim 9 in which said conversion means performs the conversion only when the document information type supplied from the host apparatus does not coincide with the document information type stored in the memory means in correspondence to the designated destination terminal.

* * * * *